US012222915B2

(12) United States Patent
Lipcon

(10) Patent No.: US 12,222,915 B2
(45) Date of Patent: *Feb. 11, 2025

(54) ACCUMULATING AND FLUSHING MUTATIONS IN A COLUMN STORE

(71) Applicant: Cloudera, Inc., Santa Clara, CA (US)

(72) Inventor: Todd Lipcon, San Francisco, CA (US)

(73) Assignee: CLOUDERA, INC., Santa Clara, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/314,813

(22) Filed: May 7, 2021

(65) Prior Publication Data

US 2021/0271653 A1  Sep. 2, 2021

Related U.S. Application Data

(63) Continuation of application No. 15/881,541, filed on Jan. 26, 2018, now Pat. No. 11,003,642, which is a (Continued)

(51) Int. Cl.
G06F 16/22 (2019.01)
G06F 16/23 (2019.01)

(52) U.S. Cl.
CPC ........ G06F 16/221 (2019.01); G06F 16/2246 (2019.01); G06F 16/2282 (2019.01); G06F 16/23 (2019.01)

(58) Field of Classification Search
CPC . G06F 16/221; G06F 16/2246; G06F 16/2282
See application file for complete search history.

(56) References Cited

U.S. PATENT DOCUMENTS 6,026,406 A * 2/2000 Huang ................ G06F 16/2343
6,119,128 A * 9/2000 Courter .............. G06F 16/2358
(Continued)

FOREIGN PATENT DOCUMENTS

CN          1737943 A  *  2/2006  ............. G06F 12/04
CN      104111962 B  *  9/2018  ......... G06F 12/0891
(Continued)

OTHER PUBLICATIONS

H. Li, "Flash Saver: Save the Flash-Based Solid State Drives through Deduplication and Delta-encoding," 2012 13th International Conference on Parallel and Distributed Computing, Applications and Technologies, Beijing, China, 2012, pp. 436-441, doi: 10.1109/PDCAT.2012.76. (Year: 2012).*
(Continued)

Primary Examiner — Neveen Abel Jalil
Assistant Examiner — Hubert Cheung
(74) Attorney, Agent, or Firm — Perkins Coie LLP

(57) ABSTRACT

Columnar storage provides many performance and space saving benefits for analytic workloads, but previous mechanisms for handling single row update transactions in column stores suffer from poor performance. A columnar data layout facilitates both low-latency random access capabilities together with high-throughput analytical access capabilities, simplifying Hadoop architectures for use cases involving real-time data. In disclosed embodiments, mutations within a single row are executed atomically across columns and do not necessarily include the entirety of a row. This allows for faster updates without the overhead of reading or rewriting larger columns.

16 Claims, 13 Drawing Sheets

Related U.S. Application Data continuation of application No. 15/149,128, filed on May 7, 2016, now abandoned.

(60) Provisional application No. 62/158,444, filed on May 7, 2015.

(56) References Cited

U.S. PATENT DOCUMENTS

| | | |
|---|---|---|
| 6,349,310 B1 | 2/2002 | Klein et al. |
| 7,548,928 B1 | 6/2009 | Dean |
| 7,567,973 B1 | 7/2009 | Burrows et al. |
| 8,010,492 B2 | 8/2011 | Biswal et al. |
| 8,452,737 B2 | 5/2013 | Netz et al. |
| 8,706,769 B1* | 4/2014 | Gao .................. G06F 16/2282 707/796 |
| 9,280,570 B2 | 3/2016 | Pruner |
| 9,519,676 B1* | 12/2016 | Finnie ................ G06F 16/2358 |
| 9,747,169 B2 | 8/2017 | Kottomtharayil et al. |
| 10,346,432 B2 | 7/2019 | Lipcon |
| 11,003,642 B2 | 5/2021 | Lipcon |
| 2003/0018644 A1 | 1/2003 | Bala et al. |
| 2003/0065884 A1* | 4/2003 | Lu ...................... G06F 12/0893 711/E12.041 |
| 2004/0148303 A1 | 7/2004 | Mckay et al. |
| 2004/0199519 A1* | 10/2004 | Gu .................... G06F 16/24537 |
| 2005/0240615 A1 | 10/2005 | Barsness et al. |
| 2007/0033354 A1 | 2/2007 | Burrows et al. |
| 2011/0010330 A1* | 1/2011 | McCline ............. G06F 16/254 707/602 |
| 2011/0022574 A1 | 1/2011 | Hansen |
| 2011/0082854 A1 | 4/2011 | Eidson |
| 2011/0213775 A1 | 9/2011 | Franke |
| 2011/0258242 A1* | 10/2011 | Eidson ................ G06F 16/2282 707/825 |
| 2011/0276744 A1 | 11/2011 | Sengupta et al. |
| 2012/0016851 A1 | 1/2012 | Hrle et al. |
| 2012/0016852 A1 | 1/2012 | Hrle et al. |
| 2012/0072656 A1 | 3/2012 | Archak et al. |
| 2012/0078978 A1 | 3/2012 | Shoolman et al. |
| 2012/0221528 A1 | 8/2012 | Renkes et al. |
| 2012/0323971 A1 | 12/2012 | Pasupuleti |
| 2013/0117247 A1* | 5/2013 | Schreter ............. G06F 16/221 707/703 |
| 2013/0166554 A1 | 6/2013 | Yoon et al. |
| 2013/0198139 A1* | 8/2013 | Skidanov ............ G06F 16/21 707/649 |
| 2013/0218840 A1* | 8/2013 | Smith ................ G06F 16/2474 707/639 |
| 2013/0275476 A1 | 10/2013 | Chandler |
| 2013/0290282 A1* | 10/2013 | Faerber .............. G06F 3/0604 707/693 |
| 2013/0311612 A1 | 11/2013 | Dickinson |
| 2013/0339293 A1 | 12/2013 | Witten et al. |
| 2014/0081918 A1* | 3/2014 | Srivas ............... G06F 16/1727 707/639 |
| 2014/0136788 A1* | 5/2014 | Faerber .............. G06F 16/23 711/133 |
| 2014/0164823 A1* | 6/2014 | Zheng ............... G11C 13/0033 714/6.11 |
| 2014/0195492 A1* | 7/2014 | Wilding ............. G06F 16/2379 707/684 |
| 2014/0215170 A1 | 7/2014 | Scarpino et al. |
| 2014/0244599 A1 | 8/2014 | Zhang et al. |
| 2014/0279855 A1 | 9/2014 | Tan et al. |
| 2014/0297601 A1 | 10/2014 | Pruner |
| 2014/0304219 A1 | 10/2014 | Yoon |
| 2014/0317048 A1* | 10/2014 | Wang ................ G06F 16/2379 707/607 |
| 2015/0026128 A1 | 1/2015 | Drobychev et al. |
| 2015/0039573 A1* | 2/2015 | Bhattacharjee ..... G06F 16/1744 707/693 |
| 2015/0046413 A1 | 2/2015 | Andrei et al. |
| 2015/0088824 A1* | 3/2015 | Kamp ................ G06F 12/1018 707/626 |
| 2015/0213071 A1* | 7/2015 | Alvey ................ G06F 16/221 707/803 |
| 2015/0237127 A1* | 8/2015 | Khemani ............ H04L 67/1095 707/625 |
| 2015/0242400 A1* | 8/2015 | Bensberg ............ G06F 16/2282 707/615 |
| 2015/0278281 A1 | 10/2015 | Zhang |
| 2015/0286668 A1 | 10/2015 | Legler |
| 2016/0042016 A1 | 2/2016 | Faerber et al. |
| 2016/0070618 A1 | 3/2016 | Pundir et al. |
| 2016/0275094 A1* | 9/2016 | Lipcon ................ G06F 16/278 |
| 2016/0328429 A1 | 11/2016 | Lipcon et al. |
| 2017/0351718 A1* | 12/2017 | Faerber .............. G06F 16/2365 |
| 2018/0150490 A1 | 5/2018 | Lipcon |
| 2018/0253468 A1* | 9/2018 | Gurajada ........... G06F 16/2255 |

FOREIGN PATENT DOCUMENTS

| | | |
|---|---|---|
| EP | 2898432 B1 | 7/2020 |
| JP | 2010146113 A | 7/2010 |
| WO | 2013074665 | 5/2013 |

OTHER PUBLICATIONS

Heman et al., "Read-Optimized Data Storage", Jul. 2008. (Year: 2008).*

Otlu, Süleyman Onur. A New Technique : Replace Algorithm to Retrieve a Version from a Repository Instead of Delta Application. Middle East Technical University, 2004. (Year: 2004).*

Data Engineering, IEEE Computer Society, vol. 36 No. 2, Jun. 2013. (Year: 2013).*

Jagatheesan, A., Levandoski, J., Neumann, T., Pavlo, A. (eds) In Memory Data Management and Analysis. IMDM IMDM 2013 2014 . Lecture Notes in Computer Science(), vol. 8921. Springer, Cham. https://doi.org/10.1007/978-3-319-13960-9_9 (Year: 2014).*

U.S. Appl. No. 15/073,509, Lipcon, et al.

Yang , et al., "A Distributed Storage Model for EHR Based on HBase", 2011 International Conference on Information ManagementInnovation Management and Industrial Engineering.

Chang, F. et al., "Bigtable: A Distributed Storage System for Structured Data." Google, Inc., OSDI 2006, 14 pages.

Extended Search Report for European Application No. 16790218.8; Date of Mailing: Jan. 4, 2018, 6 pages.

Extended Search Report for European Application No. 16765788.1; Date of Mailing: Jan. 12, 2018, 9 pages.

Examination Report for European Application No. 16765788.1; Date of Mailing: Apr. 16, 2019; 6 pages.

Lipcon et al., "Kudu: Storage for Fast Analytics on Fast Data*," Sep. 28, 2015; retrieved from the internet: URL:https://kudu.apache.org/kudo.pdf [retrieved on Dec. 13, 2017]; 13 pages.

International Search Report and Written Opinion for Application No. PCT/US2016/031391; Applicant: Cloudera, Inc.; Date of Mailing Aug. 17, 2016, 11 pages.

International Search Report and Written Opinion for International Application No. PCT/US2016/022968; Applicant: Cloudera, Inc.; Date of Mailing: Jul. 8, 2016, 7 pages.

Menon, et al., "Optimizing Key-Value Stores for Hybrid Storage Architectures," CASCON '14 Proceedings of the 24th Annual International Conference on Computer Science and Software Engineering, Nov. 3, 2014; pp. 355-358.

Sakr et al., A Survey of Large Scale Data Management Approaches in Cloud Environments, IEEE Communications Surveys & Tutorials, vol. 13, No. 3, Third Quarter 2011, pp. 311-336.

Zeng, J. et al., "Multi-Tenant Fair Share in NoSQL Data Stores," IEEE International Conference on Cluster Computing (CLUSTER), Sep. 22-26, 2014, pp. 176-184.

Hofhansl, L., About HBase flushes and compactions, hadoop-hbase.blogspot.com/2014/07/about-hbase-flushes-and-compactions.html, pp. 1-2. (Year: 2014).

Wei et al., i BigTable: Practical Data Integrity for BigTable in Public Cloud, CODASPY'13, Feb. 18-20, 2013, San Antonio, Texas, USA, pp. 341-352. (Year: 2013).

(56) References Cited

OTHER PUBLICATIONS

Wikipedia, "Multiversion concurrency control", May 1, 2015 version (Year: 2015), 6 pages.
Bernstein et al., "Concurrency Control in Distributed Database Systems", Jun. 1981 (Year: 1981), 37 pages.
Wei, et al., "iBigTable: Practical Data Integrity for BigTable in Public Cloud", CODASPY 2013, USA, Feb. 18-20, 2013, pp. 341-352.
Burns et al., In-place reconstruction of delta compressed files, 1998, Proceedings of the seventeenth annual ACM symposium on principles of distributed computing (PODC'98, Association for computing machinery, New York, NY, 267-275.

* cited by examiner

Kudu table partitioning

'tweets' table

| tweet_id | user_name | created_at | text |
|---|---|---|---|
| INT64 (PK) | STRING | TIMESTAMP | STRING |
| 1 | ApacheKudu | 123456589 | ICYMI: Kudu is now in production at @Xiaomi! |
| ... | ... | ... | ... |
| 999 | CaskData | 123456789 | CDAP 3.3.0 is released! |
| 1000 | TheASF | 123456789 | CFP for @ApacheCon closes 12 February |
| ... | ... | ... | ... |
| 1999 | ApacheParquet | 123456789 | 5 Reasons to Choose Parquet for Spark SQL |
| 2000 | ApacheDrill | 123456789 | How-to: Query dates w SQL on JSON document |
| ... | ... | ... | ... |
| 2999 | ApachePhoenix | 123456789 | Optimization for time-series data in Phoenix 4.6 |
| 3000 | mike_percy | 123456789 | Tomorrow, 6 PM #BigData App #meetup |
| ... | ... | ... | ... |
| 3999 | ApacheImpala | 123456789 | Impala 2.3 supports nested types on Parquet! |

Tablet 1: rows 1–999
Tablet 2: rows 1000–1999
Tablet 3: rows 2000–2999
Tablet 4: rows 3000–3999

*FIG. 1*

ACCUMULATING AND FLUSHING MUTATIONS IN A COLUMN STORE

CROSS REFERENCE TO RELATED APPLICATION

This application is a continuation of U.S. patent application Ser. No. 15/881,541, filed Jan. 26, 2018, entitled "MUTATIONS IN A COLUMN STORE," which is a continuation of U.S. patent application Ser. No. 15/149,128, filed May 7, 2016, entitled "MUTATIONS IN A COLUMN STORE," which claims the benefit of U.S. Provisional Application No. 62/158,444, filed May 7, 2015, entitled "MUTATIONS IN A COLUMN STORE," all of which are incorporated herein by reference in their entireties. This application also incorporates by reference in their entireties U.S. Provisional Application No. 62/134,370, filed Mar. 17, 2015, entitled "COMPACTION POLICY," and U.S. patent application Ser. No. 15/073,509, filed Mar. 17, 2016, entitled "COMPACTION POLICY."

TECHNICAL FIELD

Embodiments of the present disclosure relate to systems and methods for fast and efficient handling of database tables. More specifically, embodiments of the present disclosure relate to a storage engine for structured data which supports low-latency random access together with efficient analytical access patterns.

BACKGROUND

Some database systems implement database table updates by deleting an existing version of the row and re-inserting the row with updates. This causes an update to incur "read" input/output (IO) on every column of the row to be updated, regardless of the number of columns being modified by the transaction. This can lead to significant 10 costs. Other systems use "positional update tracking," which avoids this issue but adds a logarithmic cost to row insert operations.

BRIEF DESCRIPTION OF THE DRAWINGS

FIG. 1 illustrates an example database table, according to embodiments of the present disclosure.

DETAILED DESCRIPTION

Figure 2A:
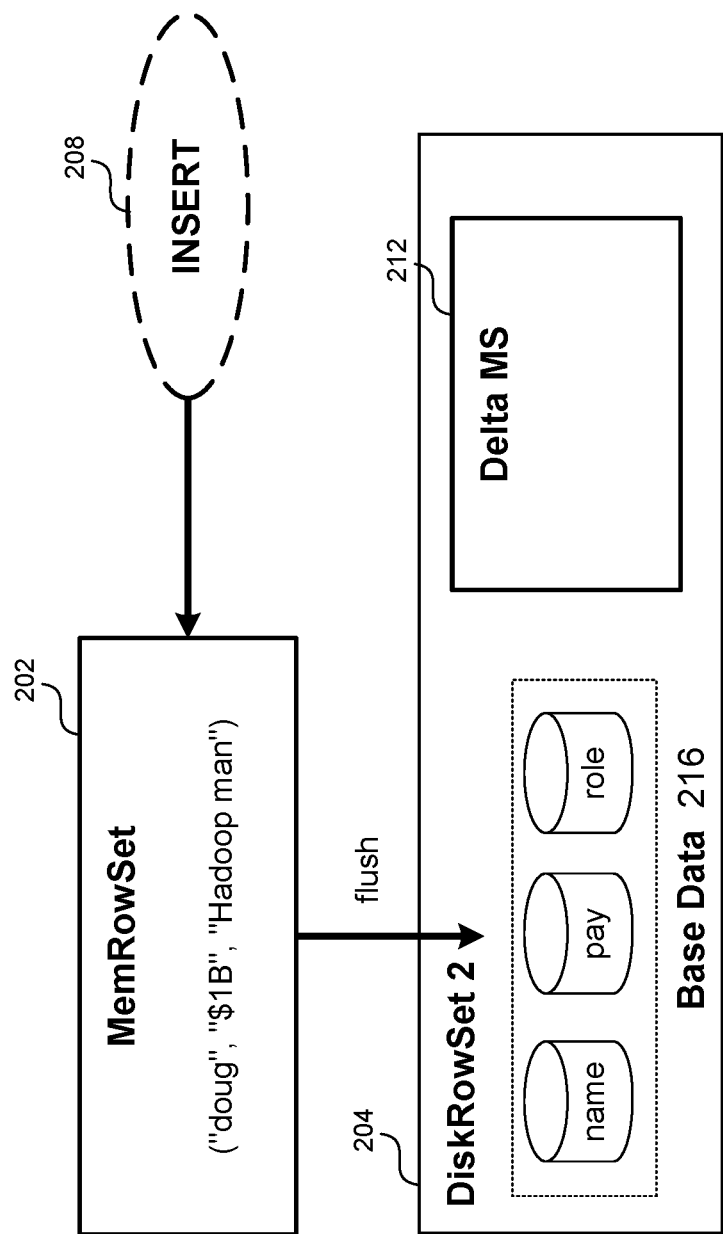
FIGS. 2A and 2B illustrate examples of insert-and-flush operations associated with respect to a database table designed according to disclosed embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but are not necessarily, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As used herein, a "server," an "engine," a "module," a "unit" or the like may be a general-purpose, dedicated or shared processor and/or, typically, firmware or software that is executed by the processor. Depending upon implementation-specific or other considerations, the server, the engine, the module or the unit can be centralized or its functionality distributed. The server, the engine, the module, the unit or the like can include general- or special-purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. § 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), and non-volatile (NV) storage, to name a few), but may or may not be limited to hardware.

Embodiments of the present disclosure relate to a storage engine for structured data called Kudu™ that stores data according to a columnar layout. A columnar data layout facilitates both low-latency random access capabilities together with high-throughput analytical access capabilities, simplifying Hadoop™ architectures for applications involving real-time data. Real-time data is typically machine-generated data and can cover a broad range of use cases (e.g., monitoring market data, fraud detection/prevention, risk monitoring, predictive modeling/recommendation, and network threat detection).

Traditionally, developers have faced the struggle of having to make a choice between fast analytical capability (e.g., using Hadoop™ Distributed File System (HDFS))) or low-latency random access capability (e.g., using HBase). With the rise of streaming data, there has been a growing demand for combining these capabilities simultaneously, so as to be able to build real-time analytic applications on changing data. Kudu™ is a columnar data store that facilitates a simultaneous combination of sequential reads and writes as well as random reads and writes. Thus, Kudu™ complements the capabilities of current storage systems such as HDFS™ and HBase™, providing simultaneous fast random access operations (e.g., inserts or updates) and efficient sequential operations (e.g., columnar scans). This powerful combination enables real-time analytic workloads with a single storage layer, eliminating the need for complex architectures. However, as mentioned above, traditional database techniques with respect to database table updates have their drawbacks, such as excessive 10 or overly burdensome computational costs for a modern, large-scale database system. Most traditional techniques are also not designed with columnar table structure in mind.

Accordingly, the disclosed method takes a hybrid approach of the above methodologies in order to obtain the benefits but not the drawbacks from them. By using positional update techniques along with log-structured insertion (with more details discussed below), the disclosed method is able to maintain similar performance on analytical queries, update performance similar to positional update handling, and constant time insertion performance.

FIG. 1 illustrates an example database table 100 storing information related to tweets (i.e., messages sent using Twitter™, a social networking service). Table 100 includes horizontal partitions 102 ("Tablet 1"), 104 ("Tablet 2"), 106 ("Tablet 3"), and 108 ("Tablet 4") hosting contiguous rows that are arranged in a columnar layout. A cluster (e.g., a Kudu™ cluster) may have any number of database tables, each of which has a well-defined schema including a finite number of columns. Each such column includes a primary key, name, and a data type (e.g., INT32 or STRING). Columns that are not part of the primary key may optionally be null columns. Each tablet in Table 100 includes columns 150 ("tweet_id"), 152 ("user_name"), 154 ("created_at"), and 156 ("text"). The primary keys (denoted "PK" in Table 100) each correspond to a "tweet id" which is represented in INT64 (64-bit integer) format. As evidenced in FIG. 1, a primary key within each tablet is unique within each tablet. Furthermore, a primary key within a tablet is exclusive to that tablet and does not overlap with a primary key in another tablet. Thus, in some embodiments, the primary key enforces a uniqueness constraint (at most one row may have a given primary key tuple) and acts as the sole index by which rows may be efficiently updated or deleted.

As with a relational database, a user defines the schema of a table at the time of creation of the database table. Attempts to insert data into undefined columns result in errors, as do violations of the primary key uniqueness constraint. The user may at any time issue an alter table command to add or drop columns, with the restriction that primary key columns cannot be dropped. Together, the keys stored across all the tablets in a table cumulatively represent the database table's entire key space. For example, the key space of Table 100 spans the interval from 1 to 3999, each key in the interval represented as INT64 integers. Although the example in FIG. 1 illustrates INT64, STRING, and TIMESTAMP (INT 64) data types as part of the schema, in some embodiments a schema can include one or more of the following data types: FLOAT, BINARY, DOUBLE, INT8, INT16, and INT32.

After creating a table, a user mutates the database table using Re-Insert (re-insert operation), Update (update operation), and Delete (delete operation) Application Programming Interfaces (APIs). Collectively, these can be termed as a "Write" operation. In some embodiments, the present disclosure also allows a "Read" operation or, equivalently, a "Scan" operation. Examples of Read operations include comparisons between a column and a constant value, and composite primary key ranges, among other Read options.

Each tablet in a database table can be further subdivided (not shown in FIG. 1) into smaller units called RowSets. Each RowSet includes data for a set of rows of the database table. Some RowSets exist in memory only, termed as a MemRowSet, while others exist in a combination of disk and memory, termed DiskRowSets. Thus, for example, with regard to the database table in FIG. 1, some of the rows in FIG. 1 can exist in memory and some rows in FIG. 1 can exist in disk. According to disclosed embodiments, RowSets are disjoint with respect to a stored key, so any given key is present in at most one RowSet. Although RowSets are disjoint, the primary key intervals of different RowSets can overlap. Because RowSets are disjoint, any row is included in exactly one DiskRowSet. This can be beneficial; for example, during a read operation, there is no need to merge across multiple DiskRowSets. This can provide savings of valuable computation time and resources.

When new data enters into a database table (e.g., by a process operating the database table), the new data is initially accumulated (e.g., buffered) in the MemRowSet. At any point in time, a tablet has a single MemRowSet which stores all recently-inserted rows. Recently-inserted rows go directly into the MemRowSet, which is an in-memory B-tree sorted by the database table's primary key. Since the Mem- RowSet is fully in-memory, it will eventually fill up and "Flush" to disk. When a MemRowSet has been selected to be flushed, a new, empty MemRowSet is swapped to replace the older MemRowSet. The previous MemRowSet is written to disk, and becomes one or more DiskRowSets. This flush process can be fully concurrent; that is, readers can continue to access the old MemRowSet while it is being flushed, and updates and deletes of rows in the flushing MemRowSet are carefully tracked and rolled forward into the on-disk data upon completion of the flush process.

Figure 2B:
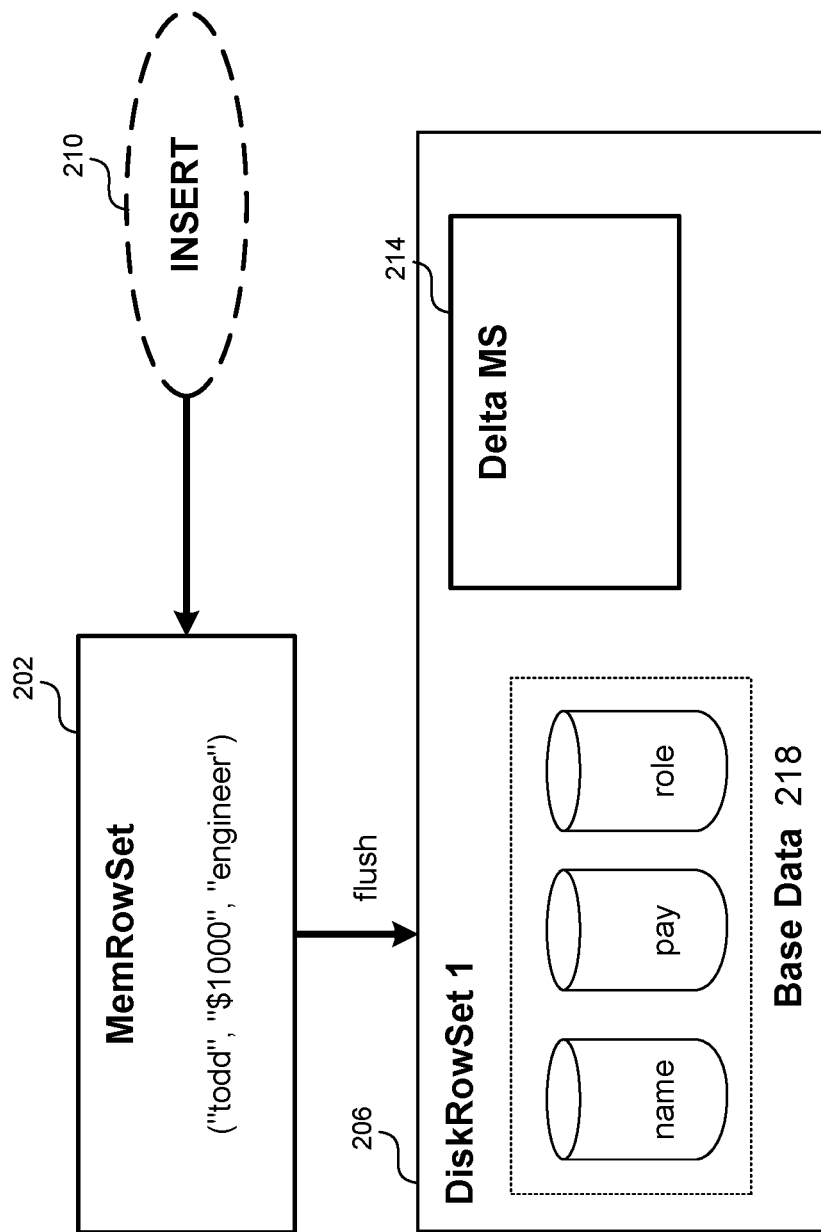

FIGS. 2A and 2B illustrate two examples of insert-and-flush operations associated with respect to a database table designed according to disclosed embodiments. Specifically, FIG. 2A illustrates an example of an insert-and-flush operation with a new first data. FIG. 2B illustrates another example of an insert-and-flush operation with a new second data. In these examples, the tablet includes one MemRowSet (identified as 202 ("MemRowSet")) and two DiskRowSets (identified as 204 ("DiskRowSet 2") and 206 ("DiskRowSet 1")). DiskRowSet 1 and DiskRowSet 2 both include columns identified as "name," "pay," and "role." Insert operation 208 in FIG. 2A saves a first incoming data initially in MemRowSet, and the data is then flushed into DiskRowSet 2. The first data identified as a row ("doug," "$1 B," "Hadoop man"), and the second incoming data is identified as a row ("todd," "$1000," "engineer"). Insert operation 210 in FIG. 2B saves a second incoming data initially in MemRowSet, and the data is then flushed into DiskRowSet 1. Each DiskRowSet includes two modules: a base data module and a delta store module (also referred to herein as Delta MS or Delta MemStore). For example, DiskRowSet 2 includes Base Data 216 and Delta MS 212. Similarly, DiskRowSet 1 includes Base Data 218 and Delta MS 214.

As described previously, each tablet has a single MemRowSet which holds a recently-inserted row. However, it is not sufficient to simply write all inserts directly to the current MemRowSet, since embodiments of the present disclosure enforce a primary key uniqueness constraint. In order to enforce the uniqueness constraint, the process operating the database table consults all of the existing DiskRowSets before inserting the new row into the MemRowSet. Thus, the process operating the database table has to check whether the row to be inserted into the MemRowSet already exists in a DiskRowSet. Because there can potentially be hundreds or thousands of DiskRowSets per tablet, this has to be done efficiently, both by culling the number of DiskRowSets to consult and by making the lookup within a DiskRowSet efficient.

In order to cull the set of DiskRowSets to consult for an INSERT operation, each DiskRowSet stores a Bloom filter of the set of keys present. Because new keys are not inserted into an existing DiskRowSet, this Bloom filter is static data. The Bloom filter, in some embodiments, can be chunked into 4 KB pages, each corresponding to a small range of keys. The process operating the database table indexes each 4 KB page using an immutable B-tree structure. These pages as well as their index can be cached in a server-wide least recent used (LRU) page cache, ensuring that most Bloom filter accesses do not require a physical disk seek. Additionally, for each DiskRowSet, the minimum and maximum primary keys are stored, and these key bounds are used to index the DiskRowSets in an interval tree. This further culls the set of DiskRowSets to consult on any given key lookup. A background compaction process reorganizes DiskRowSets to improve the effectiveness of the interval tree-based culling. For any DiskRowSets that are not able to be culled, a look-up mechanism is used to determine the position in the encoded primary key column where the key is to be inserted. This can be done via the embedded B-tree index in that column, which ensures a logarithmic number of disk seeks in the worst case. This data access is performed through the page cache, ensuring that for hot areas of key space, no physical disk seeks are needed.

Still referring to FIGS. 2A and 2B, in some embodiments the base data module stores a column-organized representation of the rows in the DiskRowSet. Each column is separately written to disk in a single contiguous block of data. In some embodiments, a column can be subdivided into small pages (e.g., forming a column page) to allow for granular random reads, and an embedded B-tree index allows efficient seeking to each page based on its ordinal offset within the RowSet. Column pages can be encoded using a variety of encodings, such as dictionary encoding or front coding, and is optionally compressed using generic binary compression schemes such as LZ4, gzip, etc. These encodings and compression options may be specified explicitly by the user on a per-column basis, for example to designate that a large, infrequently accessed text column can be gzipped, while a column that typically stores small integers can be bit-packed.

In addition to flushing columns for each of the user-specified columns of the database table into a DiskRowSet, a primary key index column, which stores the encoded primary key for each row, is also written into each DiskRowSet. In some embodiments, a chunked Bloom filter is also flushed into a RowSet. A Bloom filter can be used to test for the possible presence of a row in a RowSet based on its encoded primary key. Because columnar encodings are difficult to update in place, the columns within the base data module are considered immutable once flushed.

Thus, instead of columnar encodings being updated in a base data module, updates and deletes are tracked through delta store modules, according to disclosed embodiments. In some embodiments, delta store modules can be in-memory Delta MemStores. (Accordingly, a delta store module is alternatively referred to herein as Delta MS or Delta MemStore.) In some embodiments, a delta store module can be an on-disk DeltaFile.

A Delta MemStore is a concurrent B-tree that shares the implementation as illustrated in FIGS. 2A and 2B. A DeltaFile is a binary-typed column block. In both cases, delta store modules maintain a mapping from tuples to records. In some embodiments, a tuple can be represented as (row offset, timestamp), in which a row offset is the ordinal index of a row within the RowSet. For example, the row with the lowest primary key has a row offset 0. In some embodiments, a timestamp can be a multi-version concurrency control (MVCC) timestamp assigned when an update operation was originally written. In some embodiments, a record is represented as a RowChangeList record which is a binary-encoded list of changes to a row. For example, a RowChangeList record can be SET column id 3='foo'.

When updating data within a DiskRowSet, in some embodiments, the primary key index column is first consulted. By using the embedded B-tree index of the primary key column in a RowSet, the system can efficiently seek to the page including the target row. Using page-level metadata, the row offset can be determined for the first row within that page. By searching within the page (e.g., via in-memory binary search), the target row's offset within the entire DiskRowSet can be calculated. Upon determining this offset, a new delta record into the RowSet's Delta MemStore can then be inserted.

Figure 3:
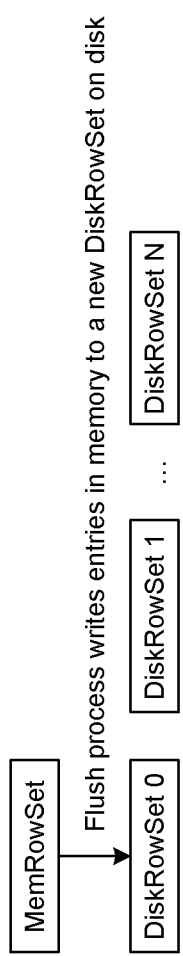
FIG. 3 illustrates an example flush operation with respect to a database table designed according to disclosed embodiments.

FIG. 3 illustrates an example flush operation in which data is written from the MemRowSet to a new RowSet on disk (also may be referred to herein as DiskRowSet). Unlike DiskRowSets, in some embodiments, MemRowSets store rows in a row-wise layout. This provides acceptable performance since the data is always in memory. MemRowSets are implemented by an in-memory concurrent B-tree. FIG. 3 also shows that the disk includes multiple DiskRowSets, for example, DiskRowSet 0, DiskRowSet 1, . . . DiskRowSet N.

According to embodiments disclosed herein, each newly inserted row exists as one and only one entry in the MemRowSet. In some embodiments, the value of this entry is a special header, followed by the packed format of the row data. When the data is flushed from the MemRowSet into a DiskRowSet, it is stored as a set of CFiles, collectively called as CFileSet. Each of the rows in the data is addressable by a sequential row identifier (also referred to herein as "row ID")," which is dense, immutable, and unique within a DiskRowSet. For example, if a given DiskRowSet includes 5 rows, then they are assigned row ID 0 through 4 in order of ascending key. Two DiskRowSets can have rows with the same row ID.

Read operations can map between primary keys (visible to users externally) and row IDs (internally visible only) using an index structure embedded in the primary key column. Row IDs are not explicitly stored with each row, but rather an implicit identifier based on the row's ordinal index in the file. Row IDs are also referred to herein alternatively as "row indexes" or "ordinal indexes."

Handling Schema Changes

Each module (e.g., RowSets and Deltas) of a tablet included in a database table has a schema, and on read the user can specify a new "read" schema. Having the user specify a different schema on read implies that the read path (of the process operating the database table) handles a subset of fields/columns of the base data module and, possibly, new fields/columns not present in the base data module. In case the fields are not present in the base data module, a default value can be provided (e.g., in the projection field) and the column will be filled with that default. A projection field indicates a subset of columns to be retrieved. An example pseudocode showing use of the projection field in a base data module is shown below:

if (projection-field is in the base-data) {
   if (projection-field-type is equal to the base-data) {
     use the raw base data as source
   } else {
     use an adapter to convert the base data to the specified type
   }
} else {
   use the default provided in the projection-field as value
}

MemRowSet, CFileSet, Delta MemStore and DeltaFiles can use projection fields (e.g., in a manner similar to the base data module, as explained above) to materialize the row with the user specified schema. In case of Deltas, missing columns can be skipped because when there are "no columns," "no updates" need to be performed.

Compaction

Each CFileSet and DeltaFile have a schema associated to describe the data in it. Upon compaction, CFileSet/DeltaFile with different schemas may be aggregated into a new file. This new file will have the latest schema and all the rows can be projected (e.g., using projection fields). For CFiles, the projection affects only the new columns where the read default value will be written as data, or in case of "alter type" where the "encoding" is changed.

For DeltaFiles, the projection is essential because the RowChangeList has been serialized with no hint of the schema used. This means that a RowChangeList can be read only if the exact serialization schema is known.

Schema IDs vs Schema Names

Columns can be added.

Columns can be "removed" (marked as removed).

To uniquely identify a column, the name of the column can be used. However, in some scenarios, a user might desire to add a new column to a database table which has the same column name as a previously removed column. Accordingly, the system verifies that all the old data associated with the previously removed column has been removed. If the data of the previously removed column has not been removed, then a Column ID would exist. The user requests (only names) are mapped to the latest schema IDs. For example, cfile-set [a, b, c, d]→[0, 1, 2, 3]

projection [b, a]→[0:2, 2:0]

RPC User Projections

No IDs or default values are to be specified (a data type and nullability are required as part of the schema).

Resolved by the tablet on Insert, Mutate and NewIterator.

The Resolution steps map the user column names to the latest schema column IDs.

User Columns not present in the latest (tablet) schema are considered errors.

User Columns with a different data type from the ones present in the tablet schema are not resolved yet.

A different data type (e.g., not included in the schema) would generate an error. An adapter can be included to convert the base data type included in the schema to the specified different data type.

Figure 4:
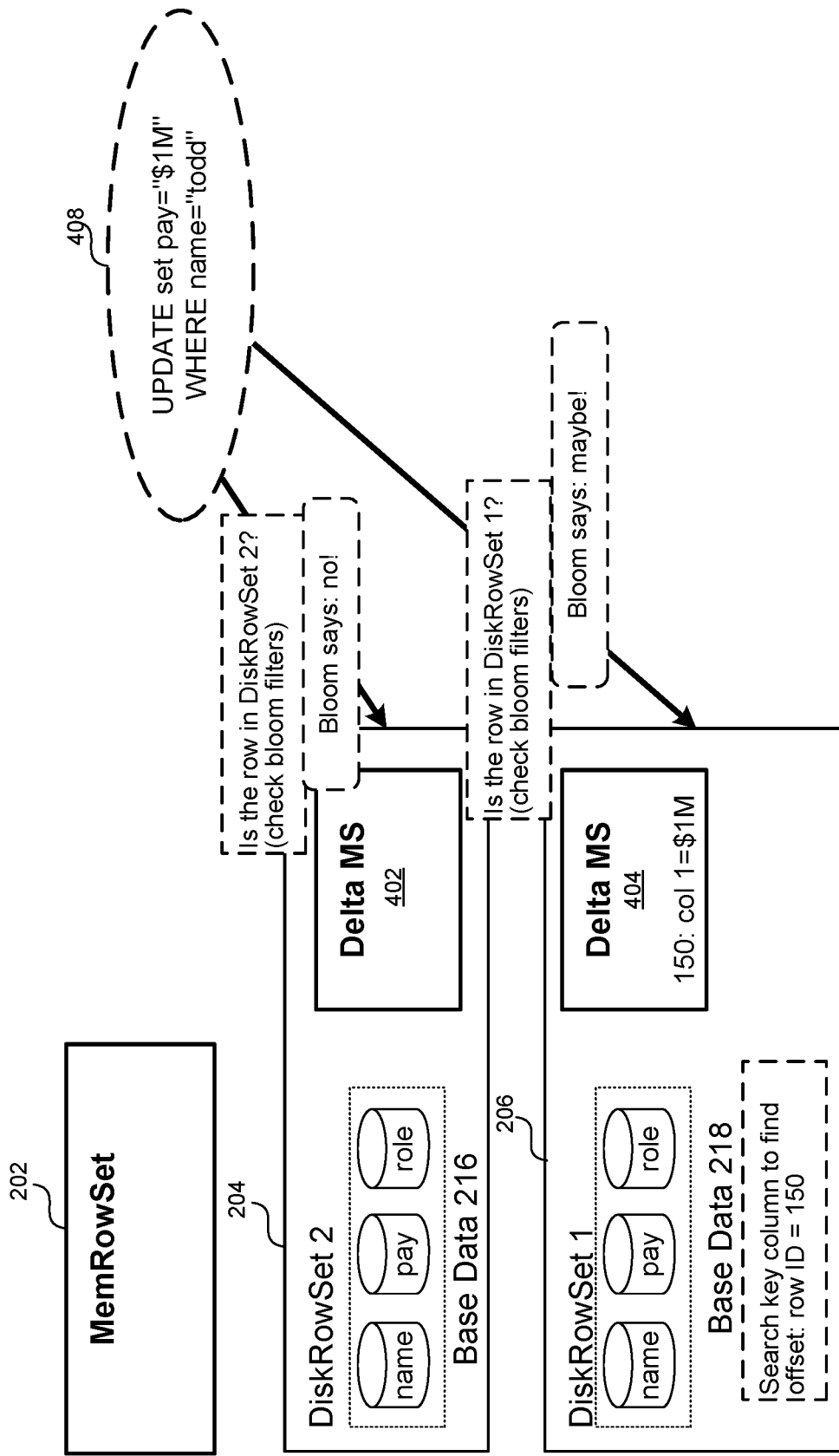
FIG. 4 illustrates an example update operation with respect to a database table shown in FIGS. 2A and 2B, designed according to disclosed embodiments.

FIG. 4 discloses an example update operation in connection with the database table shown in FIGS. 2A and 2B. According to disclosed embodiments, and as shown in FIGS. 2A and 2B, each DiskRowSet in a database table has its own Delta MemStore (Delta MS) to accumulate updates, for example, Delta MS 402 associated with DiskRowSet 2 and Delta MS 404 associated with DiskRowSet 1. Additionally, each DiskRowSet also includes a Bloom filter for determining whether a given row is included in a DiskRowSet or not. The example in FIG. 4 indicates an Update operation 408 to set the "pay" to "$1 M" of a row having the "name" "todd" from "$1000," as previously indicated in FIG. 2B. Update operation 408 (or, more generally, a mutation) applies to an already-flushed row from the MemRowSet into DiskRowSet 1 as discussed in FIG. 2B. Upon receiving the update, the disclosed system determines whether the row involved in the update is included in DiskRowSet 2 or whether it is included in DiskRowSet 1. Accordingly, the Bloom filters in RowSets included in DiskRowSet 1 and DiskRowSet 2 are queried by a process operating the database table. For example, each of the Bloom filters in DiskRowSet 2 responds back to the process with a "no" indicating that the row with the name "todd" is not present in DiskRowSet 2. A Bloom filter in DiskRowSet 1 responds with a "maybe" indicating that the row with the name "todd" might be present in DiskRowSet 1. Furthermore, the update process searches the key column in DiskRowSet 1 to determine a row index (e.g., in the form "offset:row ID") corresponding to the name "todd." Assuming that the offset row index for "todd" is 150, the update process determines the offset row index, and, accordingly, the Delta MS accumulates the update as "rowid=150: col1=$1 M." In some embodiments, updates are performed using a timestamp (e.g., provided by multi-version concurrency control (MVCC) methodologies). According to disclosed embodiments, updates are merged based on an ordinal offset of a row within a DiskRowSet. In some embodiments, this can utilize array indexing methodologies without performing any string comparisons.

MVCC Overview

In some embodiments, MemRowSets are implemented by an in-memory concurrent B-tree. In some embodiments, multi-version concurrency control (MVCC) records are used to represent deletions instead of removal of elements from the B-tree. Additionally, embodiments of the present disclosure use MVCC for providing the following useful features:

Snapshot scanners: when a scanner is created, the scanner operates as a point-in-time snapshot of the tablet. Any further updates to the tablet that occur during the course of a scan are ignored. In addition, this point-in-time snapshot can be stored and reused for additional scans on the same tablet, for example, an application that performs analytics may perform multiple consistent passes or scans on the data.

Time-travel scanners: similar to the snapshot scanner, a user may create a time-travel scanner which operates at some point in time from the past, providing a consistent "time travel read". This can be used to take point-in-time consistent backups.

Change-history queries: given two MVCC snapshots, a user may be able to query the set of deltas between those two snapshots for any given row. This can be leveraged to take incremental backups, perform cross-cluster synchronization, or for offline audit analysis.

Multi-row atomic updates within a tablet: a single mutation may apply to multiple rows within a tablet, and it will be made visible in a single atomic action.

In order to provide MVCC, each mutation (e.g., a delete) is tagged with the transaction identifier (also referred to herein as "txid" or "transaction ID")(txid) corresponding to a mutation to which a row is subjected. In some embodiments, transaction IDs are unique for a given tablet and can be generated by a tablet-scoped MVCCManager instance. In some embodiments, transaction IDs can be monotonically increasing per tablet. Once every several seconds, the tablet server (e.g., running a process that operates on the database table) will record the current transaction ID and the current system time. This allows time-travel operations to be specified in terms of approximate time rather than specific transaction IDs.

The state of the MVCCManager instance determines the set of transaction IDs that are considered "committed" and are accordingly visible to newly generated scanners. Upon creation, a scanner takes a snapshot of the MVCCManager state, and data which is visible to that scanner is then compared against the MVCC snapshot to determine which insertions, updates, and deletes should be considered visible.

In order to support these snapshot and time-travel reads, multiple versions of any given row are stored in the database. To prevent unbounded space usage, a user may configure a retention period beyond which old transaction records may be Garbage Collected (thus preventing any snapshot reads from earlier than that point in history).

Figure 5:
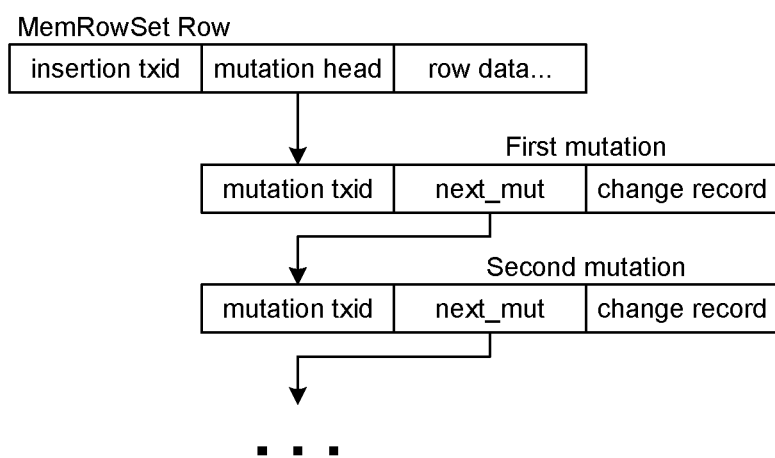
FIG. 5 illustrates a singly linked list in connection with a mutation operation with respect to a database table designed according to disclosed embodiments.

FIG. 5 illustrates a singly linked list in connection with a mutation operation with respect to a database table designed according to disclosed embodiments. In some embodiments, mutations might need to perform on a newly inserted row in a MemRowSet. In some embodiments, such mutations can only be possible when the newly inserted row has not yet been flushed to a DiskRowSet. For providing MVCC functionality, each such mutation is tagged with a transaction ID ("mutation txid") that inserted the row into the MemRowSet. As shown in FIG. 5, a row can additionally include a singly linked list including any further mutations that were made to the row after its insertion, each mutation tagged with the mutation's transaction ID. The data to be mutated is indicated by the "change record" field. Accordingly, in this linked list, a mutation txid identifies a first mutation node, another mutation txid identifies a second mutation node, and so on. The mutation head in a row (e.g., included in a MemRowSet) points to the first mutation node, a "next_mut" pointer in the first mutation node points to the second mutation node, and so on. Accordingly, the linked list can be conceived as forming a "REDO log" (e.g., comparing with traditional databases) or a REDO DeltaFile including all changes/mutations which affect this row. In the Bigtable™ design methodology, timestamps are associated with time instants of data insertions, not with changes or mutations to the data. On the contrary, in embodiments of the present disclosure, txids are associated with changes and mutations to the data, and not necessarily with the time instants of data insertions. In some embodiments, users can also capture timestamps corresponding to time instants of insertion of rows using an "inserted_on" timestamp column in the database table.

A reader traversing the MemRowSet can apply the following pseudocode logic to read the correct snapshot of the row:

If row.insertion_txid is not committed in scanner's MVCC snapshot, skip the row (i.e., the row was not yet inserted when the scanner's snapshot was made).

If row.insertion_txid is committed in scanner's MVCC snapshot, copy the row data into the output buffer.

For each mutation in the list:
if mutation.txid is committed in the scanner's MVCC snapshot, apply the change to the in-memory copy of the row.
if mutation.txid is not committed in the scanner's MVCC snapshot, skip this mutation (i.e., it was not yet mutated at the time of the snapshot).
if the mutation indicates a DELETE, mark the row as deleted in the output buffer of the scanner by zeroing its bit in the scanner's selection vector.

Examples of "mutation" can include: (i) UPDATE operation that changes the value of one or more columns, (ii) a DELETE operation that removes a row from the database, or (iii) a REINSERT operation that reinserts a previously inserted row with a new set of data. In some embodiments, a REINSERT operation can only occur on a MemRowSet row that is associated with a prior DELETE mutation.

As a hypothetical example, consider the following mutation sequence on a data table named as "t" with schema (key STRING, val UINT32) and transaction ID's indicated in square brackets ([•]):):

INSERT INTO t VALUES ("row", 1); [tx 1]
UPDATE t SET val=2 WHERE key="row"; [tx 2]
DELETE FROM t WHERE key="row"; [tx 3]
INSERT INTO t VALUES ("row", 3); [tx 4]

Figure 6:
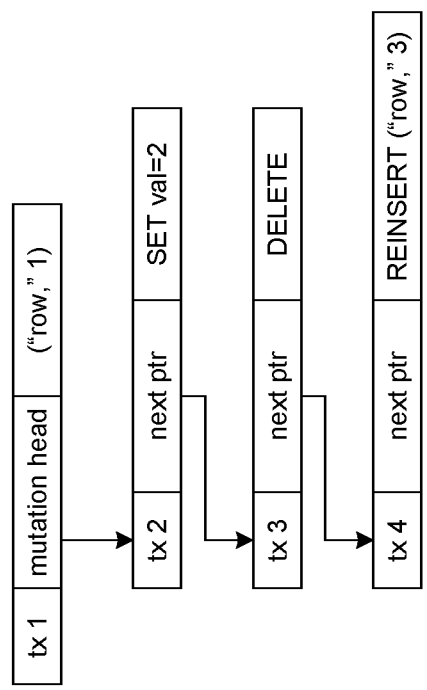
FIG. 6 illustrates an example of a singly linked list discussed in FIG. 5.

FIG. 6 represents an example of a singly linked list in connection with the above-mentioned example mutation sequence. The row associated with this mutation sequence is row 1 which is the mutation head (e.g., head of the singly linked list). The "change record" fields in this linked list are "SET val=2," "DELETE," and "REINSERT ("row," 3)" respectively for mutations with transaction IDs tx 1, tx 2, and tx 3.

In order to continue to provide MVCC for on-disk data, each on-disk RowSet (alternatively, DiskRowSet) not only includes the current columnar data, but also includes "UNDO" records (or, "UNDO" logs) which provide the ability to rollback a row's data to an earlier version. In present embodiments, UNDO logs are sorted and organized by row ID. The current (i.e., most recently-inserted) data is stored in the base data module (e.g., as shown in FIG. 2A or 2B) and the UNDO records are stored (e.g., in an UNDO module) inside the DiskRowSet. In some embodiments, the UNDO module is an UNDO DeltaFile stored in a DiskRowSet. UNDO DeltaFiles include the mutations that were applied prior to the time the base data was last flushed or compacted. UNDO DeltaFiles are sorted by decreasing transaction timestamp.

When a user intends to read the most recent version of the data immediately after a flush, only the base data (e.g., base data module) is required. In scenarios wherein a user wants to run a time-travel query, the Read path in the time-travel query consults the UNDO records (e.g., UNDO DeltaFiles) in order to rollback the visible data to the earlier point in time.

When a scanner encounters a row, it processes the MVCC information as follows:
Read image row corresponding to base data
For each UNDO record:
　If the associated txid is NOT committed, execute rollback change.

Referring to the sequence of mutations used for the example in FIG. 6, the row can be stored on-disk as:
Base data Module:
　("row", 3)
UNDO records Module:
　Before tx 4: DELETE
　Before tx 3: INSERT ("row", 2")
　Before tx 2: SET row=1
　Before tx 1: DELETE It will be recalled from the example in FIG. 6 that the most recent mutation operation was: INSERT INTO t VALUES ("row", 3) [tx 4]. Thus, it can be appreciated that each UNDO record is the inverse of the transaction which triggered it. For example, the INSERT at transaction 1 turns into a "DELETE" when it is saved as an UNDO record. The use of the UNDO record here acts to preserve the insertion timestamp. In other words, queries whose MVCC snapshot indicates tx 1 is not yet committed will execute the DELETE "UNDO" record, such that the row is made invisible. For example, consider a case using two different scanners:
Current Time Scanner (all Transactions Committed)
　Read base data
　Since tx 1-tx 4 are committed, ignore all UNDO records
　No REDO records
　　Result: current row ("row", 3)
Scanner as of Txid 1
　Read base data. Buffer=("row", 3)
　Rollback tx 4: Buffer=<deleted>
　Rollback tx 3: Buffer=("row", 2)
　Rollback tx 2: Buffer=("row", 1)
　　Result: ("row", 1)

Each scanner processes the set of UNDO records to yield the state of the row as of the desired point in time. Given that it is likely the case that queries will be running on "current" data, query execution can be optimized by avoiding the processing of any UNDO records. For example, file-level and block-level metadata can indicate the range of transactions for which UNDO records are present and, thus, processing can be avoided for these records. If the scanner's MVCC snapshot indicates that all of these transactions are already committed, then the set of UNDO deltas may be avoided, and the query can proceed with no MVCC overhead. In other words, for queries involving current data, if transactions are committed, then UNDO records (or UNDO deltas) need not be processed necessarily.

Figure 7:
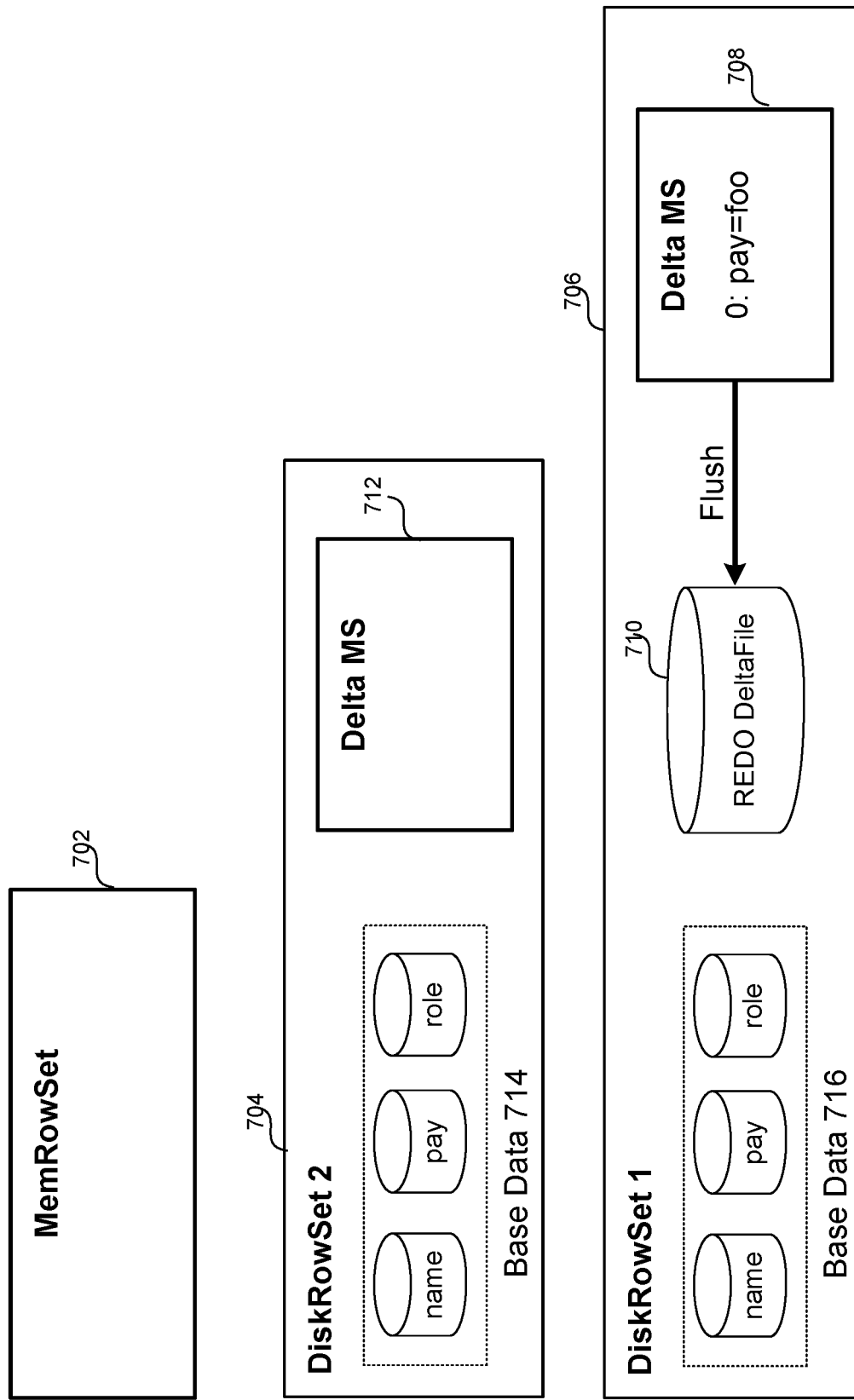
FIG. 7 illustrates an example flush operation with respect to a database table designed according to disclosed embodiments.

FIG. 7 illustrates a flush operation associated with a flush operation in a Delta MemStore. In some embodiments, updates of rows that are in a DiskRowSet and have already been flushed by a MemRowSet is handled by the Delta MemStore included in a RowSet that stores the row. In this example, it is assumed that a row with offset zero (0) is stored in DiskRowSet 1 706 of a tablet, specifically in Base Data 716 of DiskRowSet 1 706. The tablet also includes MemRowSet 702 and DiskRowSet 2 704. DiskRowSet 2 includes Base Data 714 and Delta MS 712. DiskRowSet 1 706 includes Base Data 716, REDO DeltaFile 710, and Delta MS 708. When several updates have accumulated in a Delta MS, in some embodiments, the updates are flushed to a REDO DeltaFile (e.g., REDO DeltaFile 710). An example update operation can include updating the "pay" column of a row having offset zero (0) with "foo," where the row is stored within Base Data 716 in DiskRowSet 1 706. REDO DeltaFile 710 includes the mutations (e.g., the example update operation) that were applied since Base Data 716 was last flushed or compacted. Because every transaction of a mutation carries a transaction timestamp in accordance with disclosed embodiments, REDO DeltaFile 216 is sorted by increasing transaction timestamps. In some embodiments, the data flushed into REDO DeltaFile 216 is compacted into a dense serialized format.

Handling Mutations Against On-Disk Files

In some embodiments, updates or deletes of already flushed rows do not go into the MemRowSet. Instead, the updates or deletes are handled by the Delta MemStore, as discussed in FIG. 7. The key corresponding to the updated row is searched for among all RowSets in order to locate the unique RowSet which holds this key. In order to speed up this process, each DiskRowSet maintains a Bloom filter of its primary keys. Once the appropriate RowSet has been determined, the mutation will also be aware of the key's row ID within the RowSet (as a result of the same key search which verified that the key is present in the RowSet). The mutation can then enter the Delta MemStore.

The Delta MemStore is an in-memory concurrent B-tree keyed by a composite key of the numeric row index and the mutating transaction ID. At read time, these mutations are processed in the same manner as the mutations for newly inserted data.

Figure 8:
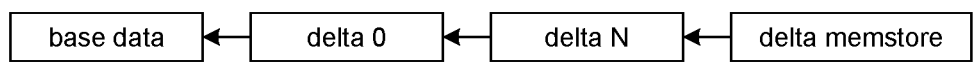
FIG. 8 illustrates an example flushing operation in memory associated with a database table according to disclosed embodiments.

FIG. 8 illustrates a flush operation of a Delta MemStore. In some embodiments, when the Delta MemStore grows large, it performs a flush to an on-disk DeltaFile and resets itself to become empty, as shown in FIG. 8. The DeltaFiles include the same type of information as the Delta MemStore, but compacted to a dense on-disk serialized format. Because these DeltaFiles (e.g., deltas) include records of transactions that need to be re-applied to the base data in order to bring rows up to date, they are called "REDO" files, and the mutations are called "REDO" records or REDO DeltaFiles. REDO DeltaFiles (e.g., stored inside in a DiskRowSet as shown in FIG. 7) include the mutations that were applied since the base data was last flushed or compacted. REDO deltas are sorted by increasing transaction timestamp.

A given row can have delta information in multiple delta structures. In such cases, the deltas are applied sequentially, with later modifications winning over earlier modifications. The mutation tracking structure for a given row does not necessarily include the entirety of the row. If only a single column of many is updated, then the mutation structure will only include the updated column. This allows for fast updates of small columns without the overhead of reading or rewriting larger columns (an advantage compared to the MVCC techniques used by systems such as C-Store™ and PostgreSQL™).

Figure 9:
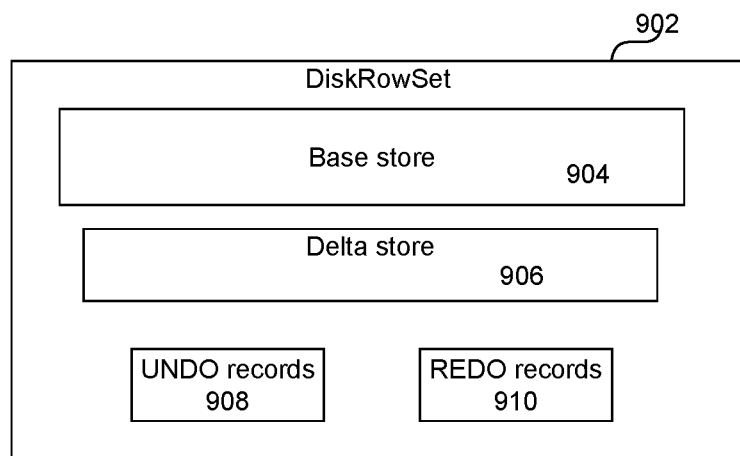
FIG. 9 illustrates an example DiskRowSet and the components/modules included therein.

FIG. 9 indicates the components included in a DiskRowSet. For example, FIG. 9 indicates that a DiskRowSet 902 includes a base store 904 (e.g., base data module 216 or 218 as shown in FIGS. 2A and 2B), a delta store 906 (e.g., Delta MS module 212 or 214 as shown in FIGS. 2A and 2B). UNDO records 908 (e.g., UNDO files), and REDO records 910 (e.g., REDO files).

Base store 904 (or base data) stores columnar data for the RowSet at the time the RowSet was flushed. UNDO records 908 include historical data which needs to be processed to rollback rows in base store 904 to points in time prior to a time when DiskRowSet 902 was flushed. REDO records 910 include data which needs to be processed in order to update rows in base store 904 with respect to modifications made after DiskRowSet 902 was flushed. UNDO records and REDO records are stored in the same file format called a DeltaFile (alternatively referred to herein as delta).

Delta Compactions

Within a RowSet, reads become less efficient as more mutations accumulate in the delta tracking structures. In particular, each flushed DeltaFile will have to be seeked and merged as the base data is read. Additionally, if a record has been updated many times, many REDO records have to be applied in order to expose the most current version to a scanner.

In order to mitigate this and improve read performance, embodiments of the disclosed database table perform background processing tasks, which transforms a RowSet from a non-optimized storage layout to a more optimized storage layout, while maintaining the same logical contents. These types of transformations are called "delta compactions." Because deltas are not stored in a columnar format, the scan speed of a tablet can degrade as more deltas are applied to the base data. Thus, in disclosed embodiments, a background maintenance manager periodically scans DiskRowSets to detect rows where a large number of deltas (as identified, for example, by the ratio between base data row count and delta count) have accumulated, and schedules a delta compaction operation which merges those deltas back into the base data columns.

In particular, the delta compaction operation identifies the common case where the majority of deltas only apply to a subset of columns: for example, it is common for a Structured Query Language (SQL) an SQL batch operation to update just one column out of a wide table. In this case, the delta compaction will only rewrite that single column, avoiding IO on the other unmodified columns.

Delta compactions serve several goals. Firstly, delta compactions reduce the number of DeltaFiles. The larger the number of DeltaFiles that have been flushed for a RowSet, the more number of times separate files have to be read in order to produce the current version of a row. In workloads that do not fit in random-access memory (RAM), each random read will result in a seek on a disk for each of the DeltaFiles, causing performance to suffer.

Secondly, delta compactions migrate REDO records to UNDO records. As described above, a RowSet consists of base data (stored per column), a set of "UNDO" records (to move back in time), and a set of "REDO" records (to move forward in time from the base data). Given that most queries will be made against the present version of the database, it is desirable to reduce the number of REDO records stored. At any time, a row's REDO records may be merged into the base data. The merged REDO records can then be replaced by an equivalent set of UNDO records to preserve information relating to the mutations.

Thirdly, delta compactions help in Garbage Collection of old UNDO records. Typically, UNDO records need to be retained only as far back as a user-configured historical retention period. For example, users can specify a period of time in the past from which time onwards the user would like to retain the UNDO records. Beyond this period, older UNDO records can be removed to save disk space. After historical UNDO logs have been removed, records of when a row was subjected to a mutation are not retained.

Types of Delta Compaction

A delta compaction can be classified as either a "minor delta compaction" or a "major delta compaction." The details for each of these compactions are explained below.

Figure 10:
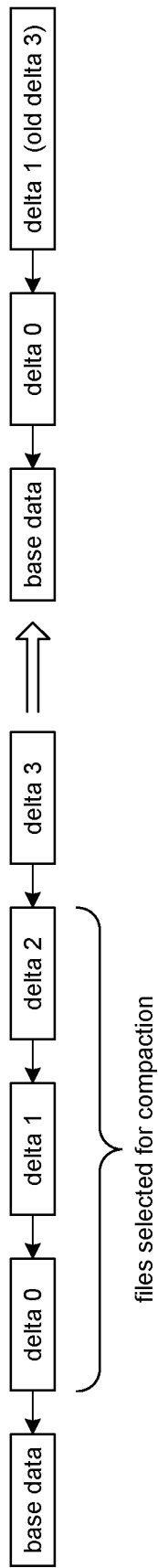
FIGS. 10-13 illustrate examples of various types of compaction performed according to disclosed embodiments.

Minor Delta Compaction:

FIG. 10 illustrates a minor delta compaction example. A "minor" compaction is one that does not include the base data and only DeltaFiles are compacted. In this type of compaction, the resulting file is itself a DeltaFile. Minor delta compactions serve the first and third goals discussed above. That is, a minor delta compaction does not read or rewrite base data. A minor delta compaction also cannot transform REDO records into UNDO records. As shown in FIG. 10, delta 0, delta 1, and delta 2 are selected for compaction. After a minor delta compaction, the resultant file is named as delta 0 and the older delta 3 file is renamed as delta 1.

Figure 11:
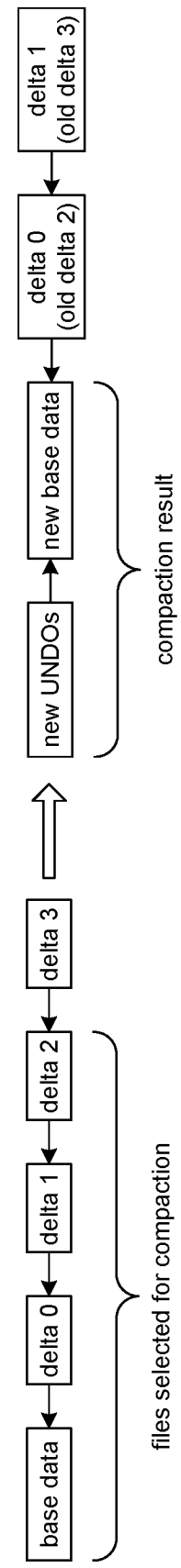

Major Delta Compaction:

FIG. 11 illustrates a major delta compaction example. A "major" compaction is one that includes the base data and one or more DeltaFiles. Major delta compactions can satisfy all three goals of delta compactions discussed above.

A major delta compaction may be performed against any subset of the columns in a DiskRowSet. For example, if only a single column has received a significant number of updates, then a compaction can be performed which only reads and rewrites that specific column. This can be a common workload in many electronic data warehouse (EDW)-like applications (e.g., updating an "order_status" column in an order table, or a "visit_count" column in a user table). In some scenarios, many REDO records may accumulate. Consequently, a Read operation would have to process all the REDO records. Thus, according to embodiments of the present disclosure, the process operating the database table performs a major delta compaction using the base data and the REDO records. After the compaction, an UNDO record (e.g., by migration of the REDO records) is created along with the base data store. In some embodiments, during a major delta compaction, the process merges updates for the columns that have been subjected to a greater percentage of updates than the other columns. On the other hand, if a column has not been subjected few updates, those columns are not necessarily merged, and the deltas corresponding to such (few) updates are maintained as an unmerged REDO DeltaFile. updating an "order_status" column in an order table, or a "visit_count" column in a user table).

In some embodiments, both types of delta compactions maintain the row IDs within the RowSet. Hence, delta compactions can be performed in the background without locking access to the data. The resulting compaction file can be introduced into the RowSet by atomically swapping it with the compaction inputs. After the swap is complete, the pre-compaction files may be removed.

Merging Compactions

In addition to compacting deltas into base data, embodiments of the present disclosure also periodically compact different DiskRowSets together in a process called RowSet compaction. This process performs a key-based merge of two or more DiskRowSets, resulting in a sorted stream of output rows. The output is written back to new DiskRowSets (e.g., rolling every 32 MB) to ensure that no DiskRowSet in the system is too large.

RowSet compaction has two goals. First, deleted rows in the RowSet can be removed. Second, compaction reduces the number of DiskRowSets that overlap in key range. By reducing the amount by which RowSets overlap, the number of RowSets which are expected to include a randomly selected key in the tablet is reduced.

In order to select which DiskRowSets to compact, the maintenance scheduler solves an optimization problem: given an IO budget (e.g., 128 MB), select a set of DiskRowSets such that compacting them would reduce the expected number of seeks. Merging (e.g., compaction) is logarithmic in the number of inputs: as the number of inputs grows higher, the merge becomes more expensive. As a result, it is desirable to merge RowSets together periodically, or when updates are pretty frequent, to reduce the number of RowSets.

Figure 12:
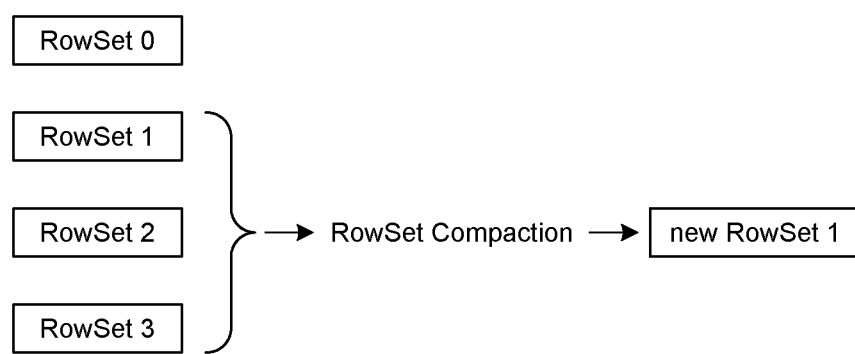

FIG. 12 illustrates an example compaction of RowSets to create a new RowSet. For example, RowSet 1, RowSet 2, and RowSet 3 are compacted to create a new DiskRowSet. In some embodiments, RowSets can be compacted according to a compaction policy. Details of compaction policies are discussed exemplarily in U.S. Provisional Application No. 62/134,370, and U.S. patent application Ser. No. 15/073,509, both of which are incorporated herein by reference in their entireties.

This design differs from the approach used in Bigtable™ in a few key ways:

1) A given key is only present most one RowSet in the tablet.

In Bigtable™, a key may be present in several different SSTables™. Any read of a key merges together data found in all of the SSTable™, just like a single row lookup in disclosed embodiments merges together the base data with all of the DeltaFiles.

The advantage of the presently disclosed embodiment is that, when reading a row, or servicing a query for which sort order is not important, no merge is required. For example, an aggregate over a range of keys can individually scan each RowSet (even in parallel) and then sum the results since the order in which keys are presented is not important. Similarly, select operations that do not include an explicit "ORDER BY primary_key" specification do not need to conduct a merge. Consequently, the disclosed methodology can result in more efficient scanning.

2) Mutation merges are performed on numeric row IDs rather than arbitrary keys.

In order to reconcile a key on disk with its potentially mutated form, Bigtable™ performs a merge based on the row's key. These keys may be arbitrarily long strings, so comparison can be expensive. Additionally, even if the key column is not needed to service a query (e.g., an aggregate computation), the key column is read off the disk and processed, which causes extra IO. Given the compound keys often used in Bigtable™ applications, the key size may dwarf the size of the column of interest by an order of magnitude, especially if the queried column is stored in a dense encoding.

In contrast, mutations in database table embodiments of the present disclosure are stored by row ID. Therefore, merges can proceed much more efficiently by maintaining counters: given the next mutation to apply, a subtraction technique can be used to find how many rows of unmutated base data may be passed through unmodified. Alternatively, direct addressing can be used to efficiently "patch" entire blocks of base data given a set of mutations.

Additionally, if the key is not needed in the query results, the query plan need not consult the key except perhaps to determine scan boundaries. For example, if the following query is considered:

>SELECT SUM(cpu_usage) FROM timeseries WHERE machine='foo.cloudera.com' AND unix_time BETWEEN 1349658729 AND 1352250720;

. . . given a compound primary key (host, unix_time)

This may be evaluated by the disclosed system with the following pseudocode:

sum=0
for each RowSet:
  start_rowid=rowset.lookup_key(1349658729)
  end_rowid=rowset.lookup_key(1352250720)
  iter=rowset.new_iterator("cpu_usage")
  iter.seek(start_rowid)
  remaining=end_rowid−start_rowid
  while remaining >0:
    block=iter.fetch_upto(remaining)
    sum+=sum(block)

Thus, the fetching of blocks can be done efficiently since the application of any potential mutations can simply index into the block and replace any mutated values with their new data.

In systems such as Bigtable™, the timestamp of each row is exposed to the user and essentially forms the last element of a composite row key. In contrast, in embodiments of the present disclosure, timestamps/txids are not part of the data model. Rather, txids can be considered an implementation-specific detail used for MVCC, as not another dimension in the row key.

Figure 13:
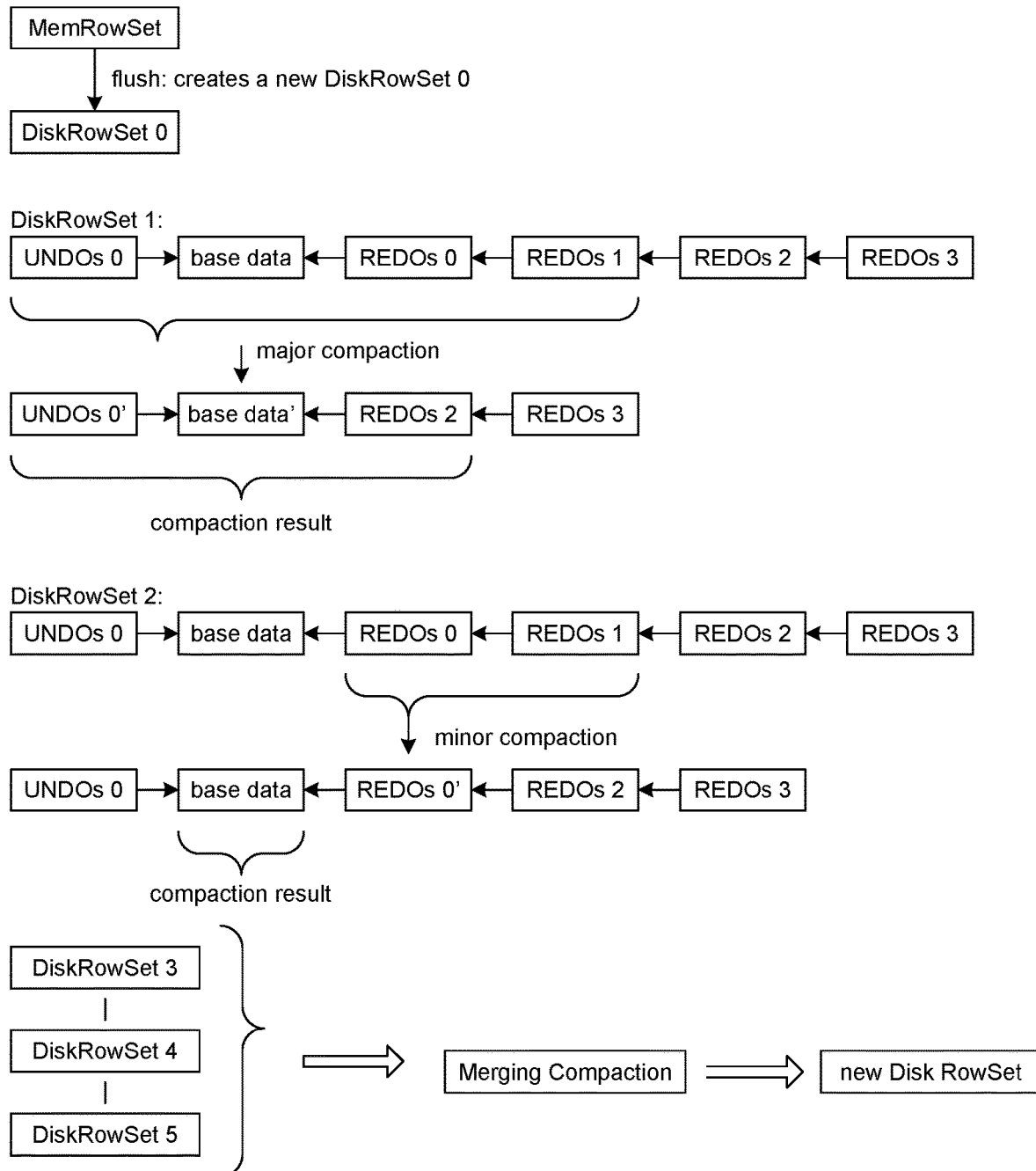

FIG. 13 is an illustration of a merging compaction. Unlike delta compactions described above, in some embodiments, row IDs are not maintained in a merging compaction. For example, FIG. 13 demonstrates that a newly inserted row is flushed from a MemRowSet to a DiskRowSet called DiskRowSet 0. A major compaction is performed on a DiskRowSet 1. The modules or files involved in the major compaction are UNDOs 0, base data, REDOs 0, and REDOs 1. The major compaction generates a compaction result with UNDOs 0' and base data'. The REDOs 2 and REDOs 3 stay unaffected because they are not involved in the major compaction. However, the base data and the UNDOs 0 are modified as a result of compaction. FIG. 13 also shows that in a DiskRowSet 2, REDOs 0 and REDOs 1 are subjected to a minor compaction, thereby generating a REDOs 0' as a compaction result. FIG. 13 also demonstrates that DiskRowSet 3, DiskRowSet 4, and DiskRowSet 5 are subjected to a merging compaction (e.g., to minimize the average "key lookup height" of the RowSets included therein) to create a new DiskRowSet.

Figure 14:
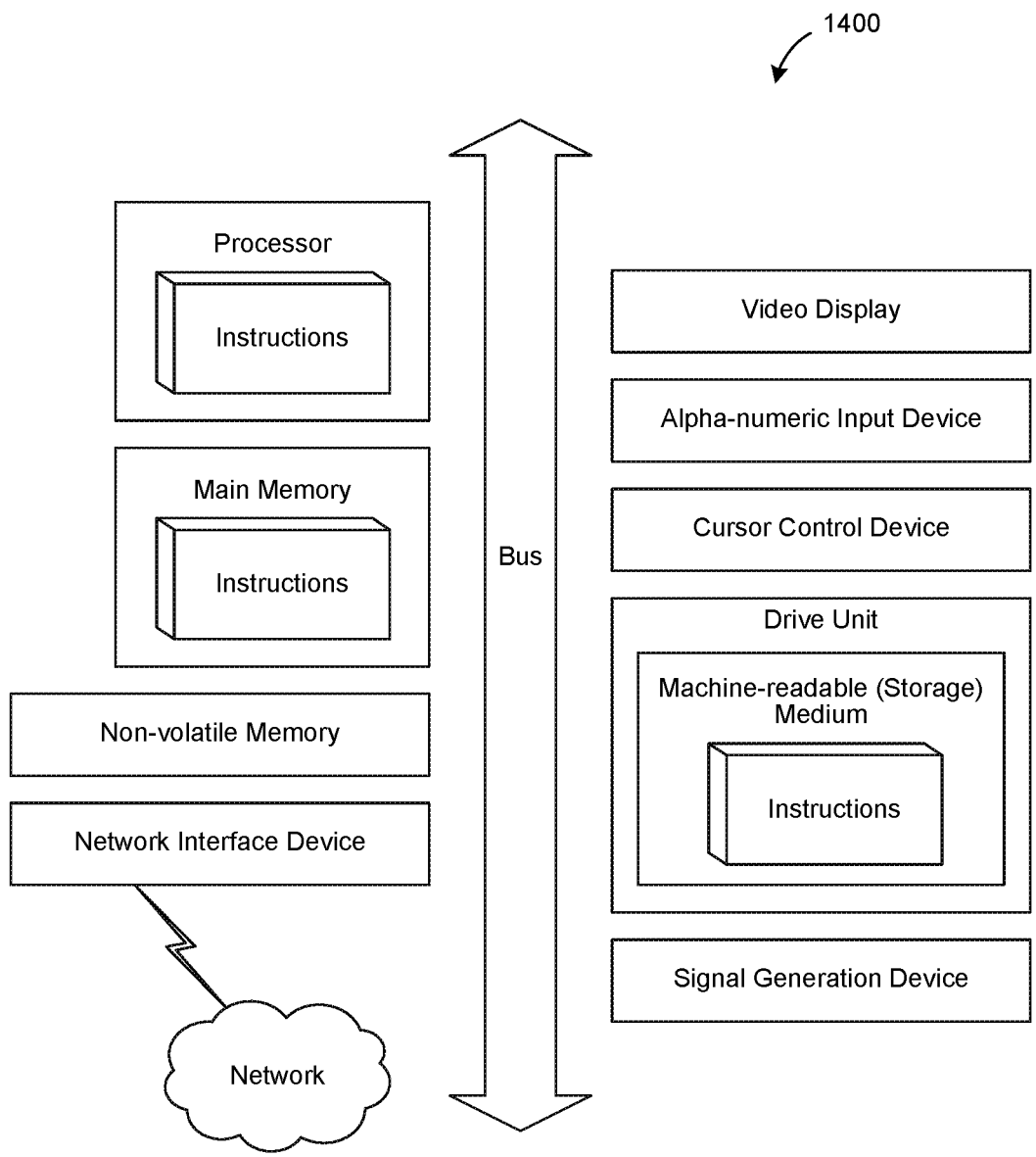
FIG. 14 shows an exemplary computer system architecture for performing one or more of the methodologies discussed herein.

FIG. 14 depicts an exemplary computer system architecture to perform one or more of the methodologies discussed herein. In the example shown in FIG. 14, the computer system 1400 includes a processor, main memory, non-volatile memory, and a network interface device. Various common components (e.g., cache memory) are omitted for illustrative simplicity. The computer system 1400 is intended to illustrate a hardware device on which any of the components depicted in FIG. 1 (and any other components described in this specification) can be implemented. The computer system 1400 can be of any applicable known or convenient type. The components of the computer system 1400 can be coupled together via a bus or through some other known or convenient device.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random-access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1400. The non-volatile memory can be local, remote, or distributed. The non-volatile memory is optional because systems can be created with all applicable data available in memory. A typical computer system will usually include at least a processor, a memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer-readable location appropriate for processing, and, for illustrative purposes, that location is referred to as the memory in this application. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 14 reside in the interface.

In operation, the computer system 1400 can be controlled by an operating system software that includes a file management system, such as a disk operating system. One example of an operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files in the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, refer to the actions and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, a switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable-type media such as volatile and non-volatile memory devices, floppy and other removable disks, hard disk drives, optical disks (e.g., Compact Disk Read-Only Memory (CD-ROMs), Digital Versatile Disks (DVDs), etc.), among others, and transmission-type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

I claim:

1. A method for a distributed database system, the method comprising:
   in response to an insert operation for a database table, storing a new row in a first in-memory store, wherein the first in-memory store is configured to flush to an on-disk store after a flushing criteria is reached;
   prior to the first in-memory store flushing the new row to the on-disk store, storing a separate mutation record linked to the new row that is stored in the first in-memory store, in response to a second mutation operation that is specified for the new row; and after the flushing criteria is reached, performing:
  modifying the new row stored in the first in-memory store based on applying the separate mutation record to the new row; and
  flushing (i) the modified new row to one or more base data files in the on-disk store, and (ii) the separate mutation record associated with the new row to one or more delta files in the on-disk store,
wherein the first in-memory store and the on-disk store are configured for disjoint row storage such that a given row of the database table exists in one of a row set (RowSet) in the first in-memory store or a RowSet in the on-disk store.

2. The method of claim 1, wherein the separate mutation record is flushed to the one or more delta files with a timestamp that is associated with the second mutation operation.

3. The method of claim 1, further comprising:
in response to a third mutation operation that specifies a flushed row stored in the on-disk store, storing a mutation record in a second in-memory store that is associated with the on-disk store, wherein the second in-memory store is configured to flush to the one or more delta files in the on-disk store after a second flushing criteria is reached.

4. The method of claim 1,
wherein the one or more base data files and the one or more delta files are immutable.

5. The method of claim 1,
wherein the database table includes (1) a number of columns, including a primary key (PK) column, and (2) a number of rows, each row having a unique PK stored in its corresponding PK column, wherein the number of rows are divided into a plurality of tablets, each tablet divided into a number of RowSets,
wherein the RowSets are disjoint with respect to a stored key so that any given key is active in at most one RowSet, and
wherein, for a given PK, at most one RowSet contains an active copy of a row with the given PK.

6. The method of claim 1, wherein the database table remains readable by a client of the database table during the flushing of the modified new row and the flushing of the separate mutation record.

7. The method of claim 1, further comprising:
subsequent to flushing the modified new row, storing a new set of rows of the database table in the first in-memory store.

8. The method of claim 1, further comprising:
processing a time-travel query for the modified new row in the on-disk store based on accessing the separate mutation record in the one or more delta files in the on-disk store.

9. A computing system comprising:
one or more processors; and
one or more memories storing instructions that, when executed by the one or more processors, cause the computing system to perform a process comprising:
  in response to a first insert operation for a database table, storing a new row in a first in-memory store, wherein the first in-memory store is configured to flush to an on-disk store after a flushing criteria is reached;
  prior to the first in-memory store flushing the new row to the on-disk store, storing a separate mutation record attached to the new row that is stored in the first in-memory store, in response to a second mutation operation that is specified for the new row; and
  after the flushing criteria is reached, performing:
    modifying the new row stored in the first in-memory store based on applying the separate mutation record to the new row; and
    flushing (i) the modified new row to one or more base data files in the on-disk store, and (ii) the separate mutation record associated with the new row to one or more delta files in the on-disk store,
  wherein the first in-memory store and the on-disk store are configured for disjoint row storage such that a given row of the database table exists in one of a row set (RowSet) in the first in-memory store or a RowSet in the on-disk store.

10. The computing system of claim 9, wherein the process further comprises:
determining that a third mutation operation specifies a flushed row that is stored in the on-disk store based on a Bloom filter for a set of primary keys present in the on-disk store; and
storing a mutation record for the third mutation operation in a second in-memory store instead of the first in-memory store based on the third mutation operation specifying the flushed row stored in the on-disk store, wherein the second in-memory store is configured to flush to the one or more delta files in the on-disk store after a second flushing criteria is reached.

11. The computing system of claim 10, wherein the process further comprises:
chunking available Bloom filters into pages corresponding to ranges of rows;
creating an index for the pages using an immutable B-tree; and
storing the pages and the index in a server-wide least recent used (LRU) page cache.

12. The computing system of claim 9,
wherein the separate mutation record attached to the new row is implemented as a singly linked list,
wherein the singly linked list includes a mutation head that points to a given mutation node, and a next mutation pointer in the given mutation node points to a subsequent mutation node.

13. A non-transitory computer-readable medium storing instructions that, when executed by a computing system, cause the computing system to perform a process comprising:
in response to a first insert operation for a database table, storing a new row in a first in-memory store, wherein the first in-memory store is configured to flush to an on-disk store after a flushing criteria is reached;
prior to the first in-memory store flushing the new row to the on-disk store, storing a separate mutation record associated with the new row that is stored in the first in-memory store, in response to a second mutation operation that is specified for the new row; and
after the flushing criteria, performing:
  modifying the new row stored in the first in-memory store based on applying the separate mutation record to the new row; and
  flushing (i) the modified new row to one or more base data files in the on-disk store, and (ii) flushing the separate mutation record associated with the new row to one or more delta files in the on-disk store,
wherein the first in-memory store and the on-disk store are configured for disjoint row storage such that a given row of the database table exists in one of a row set (RowSet) in the first in-memory store or a RowSet in the on-disk store.

14. The non-transitory computer-readable medium of claim 13, wherein the process further comprises:
performing a minor delta compaction operation that reduces a number of one or more delta files in the on-disk store by merging the one or more delta files together, without updating the one or more base data files in the on-disk store.

15. The non-transitory computer-readable medium of claim 13, wherein the separate mutation record is a REDO record, and wherein the process further comprises:
performing a major delta compaction operation that migrates REDO records to UNDO records and updatess the one or more base data files in the on-disk store.

16. The non-transitory computer-readable medium of claim 13, wherein the process further comprises:
performing a merging compaction operation that merges together a number of RowSets, in one or more on-disk stores, that overlap in range.

\* \* \* \* \*